2,971,974

O-ARYL O-LOWER ALKYL PHOSPHOROCHLORIDATES

Etcyl H. Blair, Midland, Mich., assignor to The Dow Chemical Company, Midland, Mich., a corporation of Delaware No Drawing. Filed Jan. 11, 1960, Ser. No. 1,432

4 Claims. (Cl. 260—461)

The present invention is directed to O-aryl O-alkyl phosphorochloridates corresponding to the formula

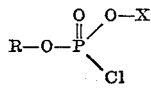

In this and succeeding formulae, X represents a lower alkyl radical and R represents halophenyl or alkyl-halophenyl wherein alkyl contains from 1–12 carbon atoms, inclusive. The expression "lower alkyl" is employed in the present specification and claims to refer to alkyl radicals containing from 1–5 carbon atoms, inclusive. These new compounds are liquid materials which are somewhat soluble in many common organic solvents and of low solubility in water. They are useful as parasiticides and are adapted to be employed as active toxic constituents of compositions for the control of mite, insect, bacterial and fungal organisms such as mites, aphids, flies, beetles and worms. The compounds are also valuable as intermediates for the preparation of more complex phosphorous derivatives and particularly for the production of O-aryl O-alkyl phosphoroamidates. In such use, the O-aryl O-alkyl phosphorochloridate intermediate is reacted with ammonia or an amine such as an alkyl amine at a temperature of from about −10° to 50° C. to produce the O-aryl O-alkyl phosphoroamidate compound. The O-aryl O-alkyl phosphorochloridates are also useful as intermediates for the production of mixed triester phosphates. In such use, the intermediate is reacted with an alkali metal salt of a phenolic compound or an aliphatic alcohol compound in the presence as reaction medium of the parent alcohol from which the salt was prepared. The reaction takes place readily at temperatures of from 0° to 70° C. with the production of the desired triester and alkali metal chloride of reaction. The latter phosphoroamidates and triester phosphates are separated and isolated by conventional methods, and are useful as preservatives for paper, paint and wood and as parasiticides, particularly for the control of bacteria, fungi, insects, mites, screw worms, *Hypoderma lineatum*, *Hypoderma bovis*, *Dermatobia hominis* and helminth organisms.

The new compounds may be prepared by reacting a lower alkanol and an O-aryl phosphorodichloridate of the formula

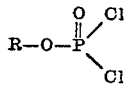

at a temperature at which hydrogen chloride is formed as a product of reaction while continuously withdrawing the hydrogen chloride by-product in the gaseous state from the reaction mixture. The reaction takes place smoothly at temperatures of from 10° C. to the boiling temperature of the employed lower alkanol with the production of the desired product and hydrogen chloride of reaction. Good results are obtained when employing substantially equimolecular proportions of the reactants. When the formation of hydrogen chloride is substantially complete (one mole of hydrogen chloride per mole of employed phosphorodichloridate), the reaction mixture may be distilled under reduced pressure to separate low boiling constituents and obtain the desired O-aryl O-lower alkyl phosphorochloridate as a residue.

For the preparation of the O-aryl O-lower alkyl phosphorochloridates, it is essential that the reaction be carried out while continuously withdrawing hydrogen chloride from the reaction mixture as formed. Thus, the reaction is carried out under reduced pressure, or while passing an inert gaseous entraining agent through the reaction mixture, or in the presence of an inert solvent having an inherent low solvent power for hydrogen chloride. Such conditions effect the continuous withdrawal of hydrogen chloride from the reaction system as formed. Suitable gaseous entraining agents include nitrogen, methyl chloride, carbon dioxide or air, while suitable solvents include the hydrocarbon and halohydrocarbon solvents boiling at temperatures not to exceed 165° C., such as methylene chloride, methylene bromide, ethylene chloride, chloroform, heptane, benzene, chlorobenzene, toluene or carbon tetrachloride. When employing one or more of the solvents to effect the withdrawal of hydrogen chloride, good results are obtained with an amount of solvent equal to at least 0.5 mole per mole of the employed O-aryl phosphorodichloridate reagent.

In carrying out the reaction, substantially equimolecular proportions of the reagents may be mixed together and maintained for a period under the afore described temperature conditions while effecting the continuous evolution of hydrogen chloride by-product from the reaction mixture as formed. When the formation of hydrogen chloride is substantially complete, the reaction mixture may be distilled under reduced temperatures to separate low boiling constituents and obtain the desired O-aryl O-lower alkyl phosphorochloridate as a liquid residue.

The following examples merely illustrate the invention and are not to be construed as limiting:

*Example 1.—O-(2,4,5-trichlorophenyl) O-methyl phosphorochloridate*

Methanol (0.1 mole; 3.2 grams) was dispersed in 25 milliliters of methylene chloride and the resulting mixture added portionwise with stirring to 31.4 grams (0.1 mole) of O-(2,4,5-trichlorophenyl) phosphorodichloridate dispersed in 50 milliliters of methylene chloride. The addition was carried out over a period of 15 minutes and at a temperature of from 24°–28° C. Stirring was thereafter continued for two hours at room temperature to complete the reaction. The reaction mixture was thereafter fractionally distilled under reduced pressure to remove low boiling constituents and obtain an O-(2,4,5-trichlorophenyl) O-methyl phosphorochloridate product as a liquid residue in a yield of 96.5 percent. Infra red analysis identified the product as O-(2,4,5-trichlorophenyl) O-methyl phosphorochloridate having a molecular weight of 310.

*Example 2.—O-(4-tert.-butyl-2-chlorophenyl) O-methyl phosphorochloridate*

Methanol (320 grams; 10 moles) was added portionwise with stirring to 3,015 grams (10 moles) of O-(4-tert.-butyl-2-chlorophenyl) phosphorodichloridate dispersed in 5,500 milliliters of methylene chloride. The addition was carried out over a period of about two hours at a temperature of from 24°–26.5° C. Stirring was thereafter continued for 4.5 hours and the temperature gradually raised to about 70° C. to complete the reaction. Upon removal of the solvent by evaporation under reduced pressure, there was obtained an O-(4-tert.-butyl-2-chlorophenyl) O-methyl phosphorochloridate product as a liquid residue. This product had a density of 1.2756 at 25° C., a refractive index n/D of 1.5160 at 25° C. and chlorine and phosphorous contents of 22.28 percent and 10.98 percent as compared to theoretical contents of 23.76 percent and 10.42 percent, respectively. The product was identified by infra red analysis as O-(4-tert.-butyl-2-chlorophenyl) O-methyl phosphorochloridate having a molecular weight of 297.

*Example 3.—O-(3,4-dichlorophenyl) O-methyl phosphorochloridate*

Methanol (8 grams; 0.25 mole) in 40 milliliters of methylene chloride was added portionwise with stirring to 70 grams (0.25 mole) of O-(3,4-dichlorophenyl) phosphorodichloridate dispersed in 250 milliliters of methylene chloride. The addition was carried out at a temperature of from 24°–25° C. and over a period of about one hour. Following the addition, agitation was continued and nitrogen gas bubbled through the reaction mixture for about 11 hours to facilitate the removal of hydrogen chloride by-product and complete the reaction. The reaction mixture was then fractionally distilled under reduced pressure at temperatures gradually increasing up to a temperature of 50° C. at 2 millimeters pressure to remove low boiling constituents and obtain an O-(3,4-dichlorophenyl) O-methyl phosphorochloridate product as a liquid residue. Infra red analysis identified the product as O-(3,4-dichlorophenyl) O-methyl phosphorochloridate having a molecular weight of 275.5.

*Example 4.—O-(2-chlorophenyl) O-methyl phosphorochloridate*

Methanol was added slowly portionwise with stirring to 123 grams (0.5 mole) of O-(2-chlorophenyl) phosphorodichloridate. The addition was carried out over a period of 3 hours and at a temperature of from 18°–30° C. and a pressure of from 30 to 70 millimeters. The addition was accomplished by the liberation of hydrogen chloride of reaction, the distillation of this hydrogen chloride as formed together with some of the methanol reactant out of the reaction zone, the collection of the distilled methanol and the collection of the hydrogen chloride in a caustic receiver. Throughout the addition, there was never more than 0.4 mole of methanol present in the reaction zone. 165 milliliters of methanol were employed in the addition, and 0.5 mole of hydrogen chloride liberated and collected. Upon completion of the addition, stirring was continued for about 1.5 hours at a temperature of from 27°–30° C. and a pressure of from 10 to 20 millimeters to complete the reaction. As a result of these operations, there was obtained an O-(2-chlorophenyl) O-methyl phosphorochloridate product as a liquid residue. This product was identified by infra red analysis as O-(2-chlorophenyl) O-methyl phosphorochloridate having a molecular weight of 241.

*Example 5.—O-(4-chlorophenyl) O-methyl phosphorochloridate*

Methanol (8 grams; 0.25 mole) in 50 milliliters of methylene chloride was added portionwise with stirring to 62 grams (0.25 mole) of O-(4-chlorophenyl) phosphorodichloridate dispersed in 150 milliliters of methylene chloride. The addition was carried out over a period of about 25 minutes and at a temperature of from 10°–15° C. Stirring was thereafter continued for about 2 hours at a temperature of from 9°–25° C. and nitrogen gas bubbled through the reaction mixture for ½ hour to facilitate the removal of hydrogen chloride by-product and complete the reaction. The solvent was then removed by fractional distillation to obtain an O-(4-chlorophenyl) O-methyl phosphorochloridate product as a liquid residue. Infra red analysis identified the product as O-(4-chlorophenyl) O-methyl phosphorochloridate having a molecular weight of 241.

*Example 6.—O-(2,4-dichlorophenyl) O-methyl phosphorochloridate*

Methanol (8 grams; 0.25 mole) in 45 milliliters of methylene chloride was added slowly portionwise with stiring to 70 grams (0.25 mole) of O-(2,4-dichlorophenyl) phosphorodichloridate dispersed in 250 milliliters of methylene chloride. The addition was carried out over a period of 45 minutes and at a temperature of from 23°–26° C. Upon completion of the addition, nitrogen gas was bubbled through the reaction mixture for a period of 4 hours while the temperature was maintained at from 25°–30° C. to facilitate the removal of hydrogen chloride by-product and complete the reaction. The reaction mixture was then fractionally distilled under reduced pressure at gradually increasing temperatures up to a temperature of 40° C. and a pressure of 4 millimeters to remove low boiling constituents and obtain an O-(2,4-dichlorophenyl) O-methyl phosphorochloridate product as a liquid residue. The product was identified by infra red analysis as O-(2,4-dichlorophenyl) O-methyl phosphorochloridate having a molecular weight of 275.5.

*Example 7.—O-(4-chlorophenyl) O-ethyl phosphorochloridate*

Ethanol (92 grams; 2 moles) dissolved in 100 milliliters of methylene chloride was added portionwise with stirring to 491 grams (2 moles) of O-(4-chlorophenyl) phosphorodichloridate dispersed in 1050 milliliters of methylene chloride. The addition was carried out over a period of two hours and at a temperature of from 20°–30° C. The reaction mixture was thereafter maintained at a temperature of from 29°–31° C. for 30 hours with a small current of nitrogen bubbling through the mixture, and thereafter fractionally distilled under reduced pressure to separate an O-(4-chlorophenyl) O-ethyl phosphorochloridate product as a liquid material boiling at 106°–107.5° C. under a pressure of 0.4–0.5 millimeters. This product had a density of 1.352 at 25° C. and a refractive index n/D of 1.5086 at 25° C.

*Example 8.—O-(2,4,5-trichlorophenyl) O-isopropyl phosphorochloridate*

Isopropyl alchohol (30 grams; 0.5 mole) was added portionwise with stiring to 157 grams (0.5 mole) of O-(2,4,5-trichlorophenyl) phosphorodichloridate dissolved in 300 milliliters of chloroform. During the addition which was carried out over a period of 0.5 hour, the temperature of the reaction mixture rose to 35° C. Following the addition, the reaction mixture was maintained at a temperature of from 38°–40° C. for about 8 hours to complete the reaction. The reaction solvent was then removed by evaporation under reduced pressure to obtain an O-(2,4,5-trichlorophenyl) O-isopropyl phosphorochloridate product as a liquid residue having a density of 1.469 at 25° C., a refractive index n/D of 1.5304 at 25° C., and a chloride content of 41.45 percent as compared to a theoretical content of 41.99 percent.

*Example 9.—O-(2,4-dibromophenyl) O-methyl phosphorochloridate*

Methanol (8 grams; 0.25 mole) was added portionwise with stirring to 92.2 grams (0.25 mole) of O-(2,4-dibromophenyl) phosphorodichloridate dispersed in 100 milliliters of carbon tetrachloride. The addition was carried out at a temperature of from 53°–58° C. and over a period of 37 minutes. The solvent was thereafter removed by distillation under reduced pressure to obtain an O-(2,4-dibromophenyl) O-methyl phosphorochloridate product as a liquid residue having a refractive index n/D of 1.5688 at 25° C.

*Example 10.—O-[2-chloro-4-(1,1-dimethylpropyl)-phenyl] O-methyl phosphorochloridate*

Methanol (64 grams; 2 mole) was added portionwise with agitation to 631 grams (2 moles) of O-[2-chloro-4-(1,1-dimethylpropyl)phenyl] phosphorodichloridate dissolved in 1000 milliliters of chloroform. The addition was carried out in two hours and at a temperature of from 28°–30° C. The reaction mixture was thereafter maintained under agitation at room temperature for 9 hours with a small stream of gaseous nitrogen bubbling through the mixture. The solvent was then removed by fractional distillation under reduced pressure to obtain an O-[2-chloro-4-(1,1-dimethylpropyl)phenyl] O-methyl phosphorochloridate product as a liquid residue having a density of 1.249 at 25° C. and a refractive index $n/D$ of 1.5149 at 25° C. O-[2-chloro-4-(1,1-dimethylpropyl)-phenyl] O-methyl phosphorochloridate has a molecular weight of 311.

*Example 11.—O-(4-chloro-2-methylphenyl) O-methyl phosphorochloridate*

Methanol (16 grams; 0.5 mole) was dispersed in 59 milliliters of methylene chloride and the resulting mixture added portionwise with stirring to 130 grams (0.5 mole) of O-(4-chloro-2-methylphenyl) phosphorodichloridate dispersed in 400 milliliters of methylene chloride. The addition was carried out over a period of about one hour and at a temperature of from 23° to 29° C. Nitrogen gas was then bubbled into the reaction mixture and stirring continued for about 9 hours at a temperature of from 22° to 30° C. to complete the reaction. The reaction mixture was then fractionally distilled under reduced pressure to separate an O-(4-chloro-2-methyl-phenyl) O-methyl phosphorochloridate product as a liquid material boiling at from 135° to 140° C. at from 3.5 to 4.0 millimeters pressure.

In a similar manner, other O-aryl O-lower alkyl phosphorochloridates may be prepared as follows:

O-(4-chloro-2-amylphenyl) O-methyl phosphorochloridate by reacting O-(4-chloro-2-amylphenyl) phosphorodichloridate with methanol.

O-(2-bromophenyl) O-amyl phosphorochloridate by reacting O-(2-bromophenyl) phosphorodichloridate with amyl alcohol.

O-(4-bromo-2,6-dichlorophenyl) O-ethyl phosphorochloridate by reacting O-(4-bromo-2,6-dichlorophenyl) phosphorodichloridate with ethanol.

O-(2-bromo-4-dodecylphenyl) O-methyl phosphorochloridate by reacting O-(2-bromo-4-dodecylphenyl) phosphorodichloridate with methanol.

O-(2-chloro-4-hexylphenyl) O-methyl phosphorochloridate by reacting O-(2-chloro-4-hexylphenyl) phosphorodichloridate with methanol.

O-(4-chloro-2-octylphenyl) O-propyl phosphorochloridate by reacting O-(4-chloro-2-octylphenyl) phosphorodichloridate with propanol.

O-(2-chloro-2-heptylphenyl) O-methyl phosphorochloridate by reacting O-(2-chloro-2-heptylphenyl) phosphorodichloridate with methanol.

O-(2,4,6-tribromophenyl) O-butyl phosphorochloridate by reacting O-(2,4,6-tribromophenyl) phosphorodichloridate with butyl alcohol.

O-(2,5-dichlorophenyl) O-propyl phosphorochloridate by reacting O-(2,5-dichlorophenyl) phosphorodichloridate with propanol.

Preferred embodiments of the present invention include the O-halophenyl O-lower alkyl phosphorochloridates and O-(4-alkyl-2-halophenyl) O-lower alkyl phosphorochloridates.

The O-aryl phosphorodichloridates employed as starting materials in the present method may be prepared by reacting a molecular excess of phosphorus oxychloride with an alkali metal salt of a suitably substituted phenol. Good results are obtained when employing from 2 to 4 of phosphorus oxychloride with each mole of alkali metal salt. In carrying out the reaction, the phenolate, preferably as the sodium salt, is added portionwise with stirring to the phosphorus oxychloride and the resulting mixture warmed for a short period to complete the reaction. The crude mixture is then filtered and the filtrate fractionally distilled under reduced pressure to separate the desired starting material.

I claim:

1. An O-aryl O-lower alkyl phosphorochloridate corresponding with the formula

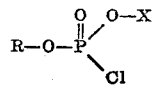

wherein X represents lower alkyl and R represents a member of the group consisting of alkyl-chlorophenyl and alkylbromophenyl in which alkyl contains from 1 to 12 carbon atoms, inclusive.

2. O-(4-tert.-butyl-2-chlorophenyl) O-methyl phosphorochloridate.

3. O-(2-chloro-4-amylphenyl) O-methyl phosphorochloridate.

4. O-(2-chloro-4-hexylphenyl) O-methyl phosphorochloridate.

References Cited in the file of this patent

UNITED STATES PATENTS

| | | |
|---|---|---|
| 2,693,483 | Tolkmith | Nov. 2, 1954 |
| 2,887,506 | Tolkmith et al. | May 19, 1959 |
| 2,922,811 | Britton et al. | Jan. 26, 1960 |